US012255932B1

(12) United States Patent
Deliligkas et al.

(10) Patent No.: US 12,255,932 B1
(45) Date of Patent: Mar. 18, 2025

(54) METHOD AND SYSTEM FOR COORDINATING SESSION RECORDINGS IN AN IP ENVIRONMENT

(71) Applicant: Unify Patente GmbH & Co. KG, Munich (DE)

(72) Inventors: Athanasios Deliligkas, Wellington, FL (US); Georgios Tsakiris, Korydallos (GR); Gerasimos Tzanetatos, Athens (GR); Myronas Kalligeris, Attika (GR)

(73) Assignee: Unify Beteiligungsverwaltung GmbH & Co. KG, Munich (DE)

( * ) Notice: Subject to any disclaimer, the term of this patent is extended or adjusted under 35 U.S.C. 154(b) by 58 days.

(21) Appl. No.: 18/488,120

(22) Filed: Oct. 17, 2023

(51) Int. Cl.
*H04L 12/24* (2006.01)
*H04L 41/0803* (2022.01)
*H04L 65/1046* (2022.01)
*H04L 65/1069* (2022.01)
*H04L 65/1104* (2022.01)

(52) U.S. Cl.
CPC ...... *H04L 65/1046* (2013.01); *H04L 65/1069* (2013.01); *H04L 65/1104* (2022.05)

(58) Field of Classification Search
CPC ............. H04L 65/1046; H04L 65/1069; H04L 65/1104
USPC ........................................................ 709/277
See application file for complete search history.

(56) References Cited

U.S. PATENT DOCUMENTS

| | | | |
|---|---|---|---|
| 7,430,187 B2 * | 9/2008 | Holt | H04L 47/2408 345/619 |
| 7,509,320 B2 | 3/2009 | Hess et al. | |
| 7,512,683 B2 * | 3/2009 | Anschutz | H04L 47/785 370/395.2 |
| 7,536,460 B2 * | 5/2009 | Anschutz | H04L 47/2408 709/226 |
| 7,573,906 B2 * | 8/2009 | Adamczyk | H04L 47/10 370/468 |
| 8,050,917 B2 | 11/2011 | Caspi et al. | |
| 8,243,902 B2 | 8/2012 | Caspi et al. | |
| 8,521,889 B2 * | 8/2013 | Anschutz | H04L 47/76 709/228 |
| 9,501,702 B2 | 11/2016 | Skarakis | |
| 9,661,484 B2 | 5/2017 | Smith et al. | |

(Continued)

*Primary Examiner* — Lance Leonard Barry
*Assistant Examiner* — Elizabeth Kassa
(74) *Attorney, Agent, or Firm* — Buchanan Ingersoll & Rooney PC

(57) ABSTRACT

Methods and apparatuses for coordinating session recordings in an IP environment can be configured so that a session is to be recorded by session recording clients, SRCs, which are located along the signaling path of the session. An SRC can attach a first SRC parameter indicating that it is available for recording the communication session upon receiving a first downstream message. The first SRC parameter can be incremented by e available SRCs downstream the signal path. One of the SRCs, can further attach a second SRC parameter indicating that this SRC records the communication session upon receiving a first upstream message as an answer to the first downstream message. In the first upstream message, the first SRC parameter can be decremented by each of the available SRCs upstream the signal path and the second SRC parameter can be propagated to each of the available SRCs upstream the signal path.

15 Claims, 7 Drawing Sheets

(56) References Cited

U.S. PATENT DOCUMENTS

| | | | |
|---|---|---|---|
| 2007/0168466 A1* | 7/2007 | Tooley | H04L 67/61 |
| | | | 709/218 |
| 2010/0316199 A1* | 12/2010 | Martin, II | H04L 65/1045 |
| | | | 379/88.08 |
| 2016/0248677 A1* | 8/2016 | Minakuchi | H04L 45/70 |
| 2018/0176281 A1* | 6/2018 | Arunachalam | H04L 43/0829 |
| 2022/0038554 A1* | 2/2022 | Merwaday | H04L 45/64 |
| 2022/0240060 A1* | 7/2022 | Nakano | H04W 4/16 |

* cited by examiner

METHOD AND SYSTEM FOR COORDINATING SESSION RECORDINGS IN AN IP ENVIRONMENT

FIELD

The present invention relates to a method and a system for coordinating session recordings in an Internet Protocol (IP) environment.

BACKGROUND

In IP telecommunications, and especially telephone systems, there may usually be a lot of recording tap points along the path of a call responsible for recording all media related to the call (voice, text, video, etc.) including additional information (location information, additional data signaled by the providers). This emerges as a natural consequence of the call or the other data passing through different (sub-) systems spanning potentially different domains, for example from access provider to originator/voice provider to Next Generation 9-1-1/1-1-2 (NG9-1-1/NG1-1-2) emergency service network (ESINET) to Next Generation Core Services (NGCS) provider to PSAP (Public Safety Answering Point). NGCS are the set of services needed to process a 9-1-1/1-1-2 call on an Emergency Services IP Network (ESInet). It includes, but is not limited to, the Emergency Service Routing Proxy (ESRP), Emergency Call Routing Function (ECRF), Location Validation Function (LVF), Border Control Function (BCF), Bridge, Policy Store, Logging Services, and typical IP services such as Domain Name System (DNS) servers and Dynamic Host Configuration Protocol (DHCP) servers. The term Next Generation (NG) Core Services includes the services and not the network on which they operate.

SUMMARY

Recording tap points are points within a telecommunications system where call traffic is monitored and captured for the purpose of recording or analysis. It is common for the recording tap points to be at the edges of a domain. The Session Recording Protocol (SIPREC) is a protocol used in Voice over IP (VoIP) solutions to facilitate the recording and monitoring of real-time communication sessions. Within the SIPREC, Session Recording Clients (SRCs) are solution components that capture and send the real-time communications media to a Session Recording Server (SRS). SRCs are typically located at the edges of the domain in which recordings are required. At the services overlay layer, it is common for Session Border Controllers (SBCs), or the equivalent Border Control Functions (BCFs) in a NG9-1-1/NG1-1-2 solution, to act as SRCs. Typically, one or more SBCs/BCFs in the domain in which the recording is needed is/are statically configured to handle all the call recordings. The latter implies that the chosen SBCs/BCFs is/are constantly taking up the complete call recording load, on top of the actual call media anchoring load, while the remaining SRC-capable components in the call path never take up any of the call recording load and have only to deal with the call media anchoring load. This potentially decreases the call handling capacity of the recording SBCs/BCFs which constantly need to reserve central processing unit (CPU) and memory resources to service the recordings causing an overall decrease in their call handling capacity and making them subject to overload issues.

However, when a telephony system is viewed as a distributed system, modern load balancing techniques can be applied. For example, an external load balancer additionally to the core telephony system could be used to elect one of the potential SRCs to initiate the recording for a call. For the purposes of this application, a call can include voice, text, or video media. Another method, based on distributed system algorithms would be to run an election scheme, per call, to select one of the SRCs for recording a new arriving call Both schemes could be accommodated to handle selection under failures.

However, the usage of a centralized load balancer requires additional resources to be introduced in the IP telephony solution, namely the load balancer component. Moreover, the recording load balancer must be aware of the new calls arriving to the system. This means that either some external component must feed new call arrival events to the load balancer or that the load balancer is itself capable to handle the underlying protocol and resides inside a call path through the system (e.g. an emergency call path in an emergency network/system). The latter implies that this component itself must be a highly available redundant component (as in a cluster) so that failures of this component do not result in total loss of calls and that it must always be in the call path. For example, the latter is critical in emergency systems where every single call has to be recorded.

The usage of a more modern 'leader-election'-type of distributed algorithm or mechanism would require knowledge of all the available SRCs. This means that for any element that is doing any recording and that is added or removed from the system, such a 'leader-election' mechanism must be reconfigured manually or dynamically through the usage of a specific mechanism. Additionally, such 'leader-election' mechanism must also be aware of the path that the call is taking so that it knows which recorders may be available to use.

Therefore, embodiments of the present invention can be configured to provide a method and a corresponding system for coordinating call session recordings in an IP environment and which overcomes the disadvantages of the state of the art. For example, embodiments of a method and a system for coordinating SIPREC session recordings in an IP environment can be provided that can handle load balancing of call recordings in an IP telephony system without the usage of explicit load balancer functional elements or the usage of a 'leader-election' mechanism.

In some embodiments, a method for coordinating session recordings in an IP environment is provided, wherein sessions are to be recorded by Session Recording Clients, SRCs, which are located along the signalling path of the session, can include attaching, by an $SRC_n$, a first SRC parameter n indicating that the $SRC_n$ is available for recording the communication session upon receiving a first downstream message, wherein the first SRC parameter n is incremented by each of the available SRCs downstream the signal path; attaching, by one of the available SRCs, a second SRC parameter indicating that the one of the available SRC records the communication session upon receiving a first upstream message as an answer to the first downstream message, wherein in the first upstream message, the first SRC parameter n is decremented by each of the available SRCs upstream the signal path, and, wherein the second SRC parameter is propagated to each of the available SRCs upstream the signal path; notifying, by a second downstream message, each of the available SRCs about a recording of the communication session wherein the second SRC parameter is propagated to each of the available SRCs downstream the signal path. $SRC_n$ can stand for the number n of an available SRC within the signalling path.

In some embodiments, means for coordinating call recording tasks to achieve balancing of the recording load between multiple recording clients can be utilized to help improved the utilization of the SRC resources and potentially increasing the actual call handling capacity of the involved components and reducing the chances of entering overload state. This can be done without introducing any additional signaling or external components. Further, embodiments can be configured to utilize a load-balancing scheme without the use of a centralized load-balancing element so that all the potential recording tap points can be utilized and, under normal operation, divide equally the recording load among them. Thereby, the load-balancing as a characteristic of the method can be configured to apply to call paths, in other words it is per call path.

According to a preferred embodiment, the first downstream message is a Session Initiation Protocol, SIP, INVITE message, the first upstream message is a SIP 200 OK message, and the second downstream message is a SIP acknowledgement, SIP ACK, message. In particular, this applies to the case that recordings are initiated at call establishment.

According to another preferred embodiment, the first downstream message is a SIP INVITE message, the first upstream message is a 180 Ringing message, and the second downstream message is a SIP pre-acknowledgement, SIP PRACK, message. In particular, this applies for accommodating early media cases.

According to still another preferred embodiment, the first downstream message is a SIP INVITE message, the first upstream message is a SIP 200 OK/SIP acknowledgement, ACK, message and the second downstream message is a SIP UPDATE and/or SIP INFO message. For example, this embodiment can be adapted for accommodating for possible back-to-back user agents (B2BUAs) in the path.

Embodiments can also be configured for utilization in conjunction with emergency callbacks. In this case, the call can be initiated from the call-taker towards the caller and also in this emergency call back use case. However, in such a case the balancing characteristic can be configured to apply to calls from either direction of emergency callbacks.

Further, according to another preferred embodiment, embodiments of the method can include attaching, by an available downstream SRC, the second SRC parameter indicating that the available downstream SRC records the communication session upon receiving the second downstream message as an answer to the first upstream stream message without the second SRC parameter, wherein the second SRC parameter is propagated to each of the available SRCs downstream the signal path.

In some embodiments, the first SRC parameter n can be a counter which is incremented or decremented by a value of 1 downstream or upstream the signal path, respectively, and/or wherein using, by the available SRCs, the first SRC parameter n for calculating the probability to record the communication session of the $SRC_n$, wherein the probability is defined as 1/first SRC parameter n associated with $SRC_n$.

Embodiments of the method can also include other steps. For example, embodiments can include attaching, by one of the available SRCs, the second SRC parameter indicating that the available SRC records the communication session after checking, by the available SRC, that its probability is less or equal to 1/first SRC parameter n associated with $SRC_n$ upon receiving a first upstream message as an answer to the first downstream message, the first parameter is decremented by each of the available SRCs upstream the signal path and wherein the second parameter is propagated to each of the available SRCs upstream the signal path; and notifying, with the second downstream message each of the available SRCs about a recording of the communication session, wherein the second parameter is propagated to each of the available SRCs downstream the signal path.

As yet another example, embodiments can also include not attaching, by an SRC, a first SRC parameter n upon receiving a first downstream message, if this SRC is unavailable for recording the communication session. In the case where no SRC wants to record and so there is no first SRC parameter n present, then this can be handled as one of the existing error handling methods according to the invention.

In some embodiments, the SRCs can include one or more of a Session Border Controller, SBC, and/or a Border Control Function, BCF. Each SRC can be configured as a communication device that includes at least one processor connected to a non-transitory memory and at least one transceiver. In some embodiments, the SRC can include an application or code defined in memory of the device that can be performed when the application or code is run by the processor, for example.

Some embodiments of the method can also include carrying the first SRC parameter n and/or second SRC parameter in upstream and/or downstream messages within an X header field and/or as parameters in existing header fields and/or in the Session Description Protocol, SDP.

Embodiments of system for coordinating session recordings in an Internet Protocol, IP, environment can also be provided. The system can be adapted to perform an embodiment of the method for coordinating session recordings in an IP environment.

According to a preferred embodiment, the system comprises; one or more of a session recording client, SRC, a communication system, a caller and a call taker. The caller can be a caller device that can make a call or initiate a call. Examples of a caller device can include a mobile telephone, smart phone, tablet, or other type of communication terminal. The call taker can be a call taking device. Examples of a call taking device can include a mobile telephone, smart phone, tablet, a laptop computer, a personal computer, or other type of communication terminal configured to receive a call. The caller device and the call taker device can be communication devices that include a processor connected to a non-transitory computer readable medium and at least one transceiver. The communication system can include one or more computer devices. In some embodiments, the communication system can include at least one server that includes a processor connected to non-transitory memory that is communicatively connectable to the caller device and the call taker device, for example. Each SRC can also be a type of communication device that includes a processor connected to a non-transitory readable medium (e.g. non-transitory memory) as well.

Embodiments can also be configured as a program element that can be configured for being executed by a processor so that the device of the processor is adapted to carry out one or more steps of a method for coordinating session recordings in an IP environment. The program element can be stored in a non-transitory computer readable medium so that a processor can access the program element and run the program element.

According to another aspect of the present invention, a computer-readable medium comprising program code is provided, which when being executed by a processor is adapted so that a device of the processor performs one or more steps of a method for coordinating session recordings in an IP environment. A computer-readable medium may be a non-transitory computer readable medium such as, for example, a floppy disk, a hard disk, an USB (Universal Serial Bus) storage device, a RAM (Random Access Memory), a solid state drive, a ROM (read only memory) or an EPROM (Erasable Programmable Read Only Memory). A computer-readable medium may also be a data communication network, e.g. the Internet, which may allow downloading a program code.

It has also to be noted that aspects of the invention have been described with reference to different subject-matters (e.g. embodiments of methods, telecommunication system embodiments, non-transitory computer readable medium embodiments, etc.). However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus type embodiment and features relating to a method type embodiment can be combined. In other words, all features described in the present application can be combined to provide additional embodiments.

Other details, objects, and advantages of embodiments of our telecommunications apparatus, telecommunications system, telecommunications device, and telecommunications method will become apparent as the following description of certain exemplary embodiments thereof proceeds.

BRIEF DESCRIPTION OF THE DRAWINGS

The invention and embodiments thereof will be described below in further detail in connection with the drawings. The various embodiments and/or their individual sub-items and features can be combined with each other in any logical way. Even if some of the embodiments are described on the basis of a particular type of network architecture, they are explicitly not limited to them but can also be applied to other networks or communication system architecture as well. The drawings include.

REFERENCE NUMERALS USED IN THE DRAWINGS INCLUDE

1 Session Recording Client 1, SRC 1
2 Session Recording Client 2, SRC 2
3 Session Recording Client 3, SRC 3
4 Session Recording Client 4, SRC 4
5 Session Recording Client 5, SRC 5
BCF-I ingress Border Control Function
BCF-E-1 egress Border Control Function 1
BCF-E-2 egress Border Control Function 2
Ingress SBC ingress Session Border Controller
ESRP Emergency Service Routing Proxy
PSAP Public Safety Answering Point
ECRF Emergency Call Routing Function
SIP INVITE Session Initiation Protocol INVITE message
SIP 200 OK Session Initiation Protocol 200 OK message
SIP ACK Session Initiation Protocol acknowledgement, ACK, message
SIP PRACK Session Initiation Protocol pre-acknowledgement, PRACK message
SIP 180 Ringing Session Initiation Protocol 180 Ringing message
src_count first SRC parameter
src_contact second SRC parameter
SRS Session Recording Server
UA User Agent(s)
CTI Computer Telephony Integration
SIPREC Session Recording Protocol
DNS Domain Name System
rec recording

DETAILED DESCRIPTION

Figure 1:
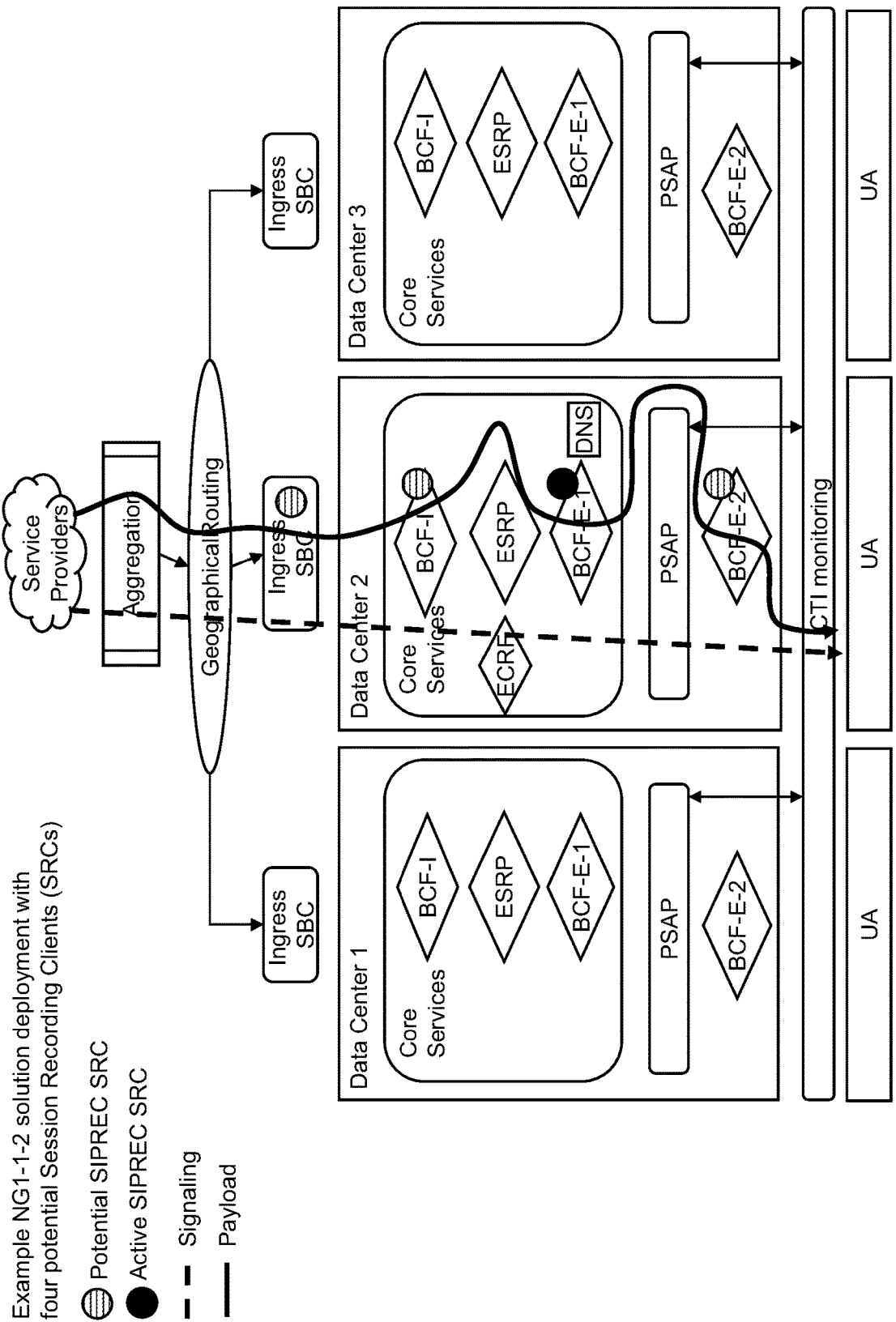
FIG. 1 shows a schematic illustration of an overview of existing recording solutions according to the state of the art.

FIG. 1 schematically shows an overview of a recording solution according to the state of the art. In this example, the concrete context to which the recording solution is applied is a Next Generation 1-1-2 (or Next Generation 9-1-1) telephony sub-system. In the context of NG9-1-1/NG1-1-2 systems recordings are mandated to use the SIPREC (IETF RFC8766) recording protocol. The SIPREC recording protocol is based on a Client/Server architecture where the client corresponds to the device or element that is normally present in the recorded call's media path and is responsible for controlling the SIPREC session. The server typically corresponds to a SIPREC-capable recording server that receives the recorded call's media through the established SIPREC session from the client. Typically, one or more SBCs/BCFs in the domain in which the recording is needed is/are statically configured to handle all the call recordings. The latter implies that the chosen SBCs/BCFs is/are constantly taking up the complete call recording load, on top of the actual call media anchoring load, while the remaining SRC-capable components in the call path, never take up any of the call recording load and have only to deal with the call media anchoring load. This potentially decreases the call handling capacity of the recording SBCs/BCFs which constantly need to reserve CPU and memory resources to services the recordings causing an overall decrease in their call handling capacity and making them subject to overload issues. The situation is depicted in FIG. 1 where there is a total of four potential recording tap points (Ingress SBC, BCF-I, BCF-E-1, BCF-E-2) but only one (BCF-E-1) takes the complete recording load. FIG. 1 shows that the signaling from outside the emergency network to the user agent (UA) is relatively simple to understand, while the actual payload of the data is more complex.

The payload can be the part of transmitted data that is the actual intended message. Headers and metadata are sent only to enable payload delivery. Incoming multimedia calls to be recorded are received from service providers and are first aggregated and a geographic routing is performed. However, it is common that incoming multimedia calls to be recorded are first received at aggregation points. The aggregation points or centers act as interconnection or in other words traffic hand-off points between service providers and the NG9-1-1 or NG1-1-2 provider. Based on the system topology, geospatial call routing may or may not occur at those centers. It is common to provide routing redundancy to accommodate for NGCS data center failures at those aggregation points/centers. It is also common that the service provider itself already selects the aggregation center based on the caller's location. For example, an emergency call from an emergency caller at the Northern region of a state or country would typically reach an aggregation center that serves the Northern region of the state or country. The call is then routed via an Ingress SBC to the Data Center 2 determined by the geographical routing. Within the Data Center 2, the call is routed to the core services via the Ingress BCF-I. The call exits the Core Services via the egress BCF-E-1. In this example, the BCF-E-1 takes over the session recording. The call exits the Data Center 2 via another BCF-E-2 and is passed on to the user agents. In terms of the invention, egress means data traffic that leaves part or all of a network and ingress refers to data traffic that crosses the boundary of a network from the outside.

FIGS. 2 to 7 illustrate exemplary embodiments in the context of a Next Generation 9-1-1/1-1-2 telephony subsystem. In the context of NG9-1-1/NG 1-1-2 systems, recordings are mandated to use the SIPREC (IETF RFC8766) recording protocol. However, although the context of NG9-1-1/NG1-1-2 telephony sub-systems are used to describe the mechanics of these embodiments, the invention is not limited to only such use cases but can also be applied to general VoIP telecommunications systems that can be configured to use the SIPREC recording protocol. Furthermore, embodiments can be configured so that they can be applicable to other contexts different than call recordings.

Figure 2:
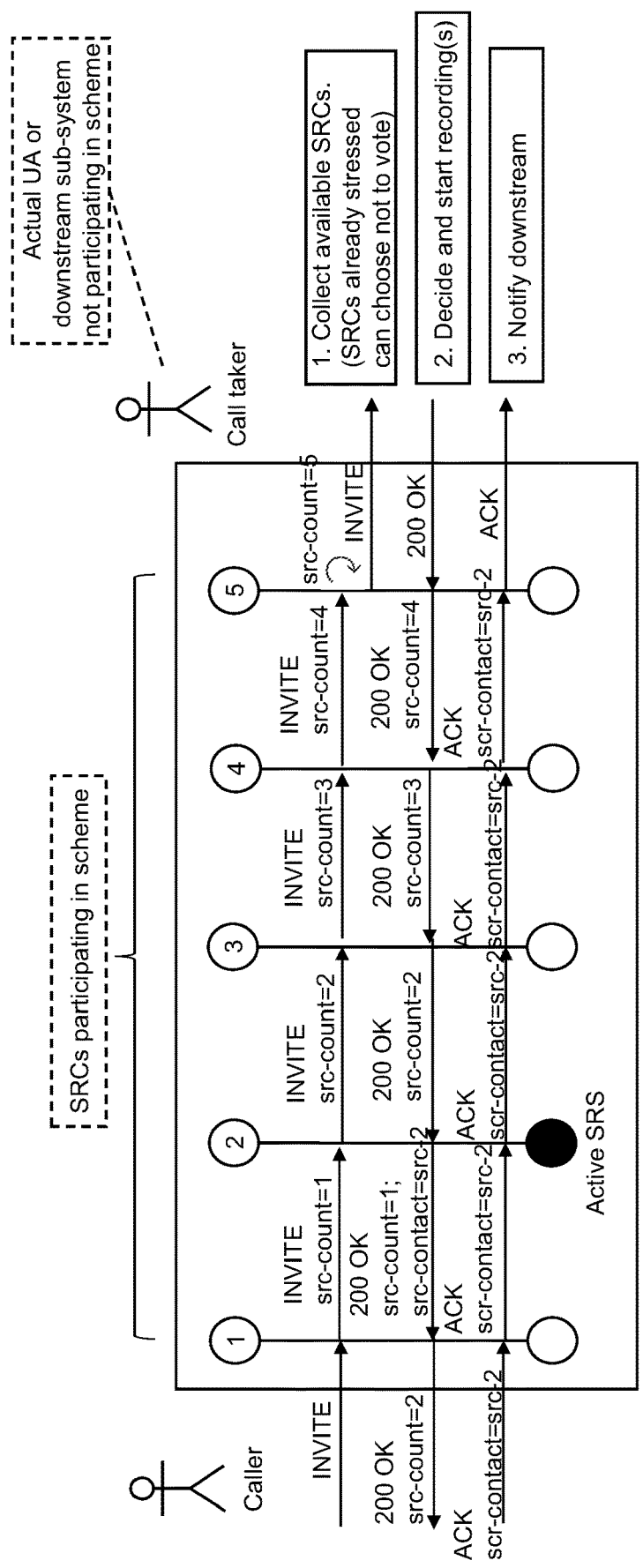
FIG. 2 shows a flowchart of the method for session recording according to an embodiment of the invention.

FIG. 2 shows a flow chart of the invention in context of the SIPREC recording protocol. In this and the following FIGS. 2 to 7, the caller icon and the call taker icon stand for the beginning and the end of a telecommunications session that is to be recorded. The section of this session that is concerned with the recording scheme of the session is shown in a rectangular box that comprises the SRCs available for the scheme. Here, SIPREC SRCs initiate call recordings with the final 200 OK responses. It is noted that even though a description of the mechanism in terms of initial INVITE, 200 OK and ACK messages is provided, the scheme can be modified to use other call signalling messages. This means that an extension to this method is possible, for example, to accommodate the recordings of calls with early media (in this case different messages will be used). In essence, a form of a distributed voting scheme is used (as opposed to a centralized controller solution) that utilizes the existing SIP call signalling flow to balance the recordings among SRCs that span a call path within a domain or even across domains. The scheme can be thought of comprising of three phases. In the first phase which occurs with the initial call setup signalling (INVITE message), the SRCs implicitly state their wish to participate in the voting scheme. In this phase an already overwhelmed SRC can choose not to participate in the scheme.

During call initiation (SIP INVITE), the first SRC (1) that participates in the scheme and is capable of recording the call attaches in the signalling an src-count parameter with value 1. All downstream SRCs (2, 3, 4, 5) that are capable of recording the call increment this src-count parameter subsequently. In the second phase, the selection of the SRC client is performed and the recording session is initiated. Each SRC will decide probabilistically to record the call and if it decides to record then will indicate this through signalling. During call answer (SIP 200 OK), each SRC (1, 2, 3, 4, 5) beginning from the last one (5) will decide probabilistically (e.g. with probability of 1/src-count) if it will record the call. The SRC that decides to record the call will attach in the signalling an src-contact parameter with value src=SRC contact identifier>>. All upstream SRCs that see the src-contact parameter will know that the call is being recorded by a downstream element so they will not record the call. In FIG. 2 the SRC 2 sets the <SRC contact identifier>>.

Additionally, all SRCs in the path will decrement the src-count parameter when sending downstream the SIP 200 OK signalling message. Consequently, when the first (recording capable) SRC handles the 200 OK, and if no other SRC has decided to record the call, then this SRC will record the call since the probability for doing so will be 1. The third phase ensures that all the SRCs in the call path receive the acknowledgement that a recording for the call has started. During call acknowledgement (SIP ACK), the SRC that will record the call (in this case SRC 2) will insert in the SIP Signalling the same src-contact parameter with the same value src=<SRC contact identifier>>. This way all downstream elements will also be informed that an SRC will record the call. The parameters used in INVITE, 200 OK and/or ACK messages can be carried within an X header field or as parameters in existing header fields or the SDP, subject to implementation details. An assumption for this specific case here is that recordings are started with the 200 OK (e.g. no early media recordings required) but can be extended if needed. Further, it is assumed that all elements in the signalling path will proxy the messages and so the SIP ACK messages will go end to end.

Figure 3:
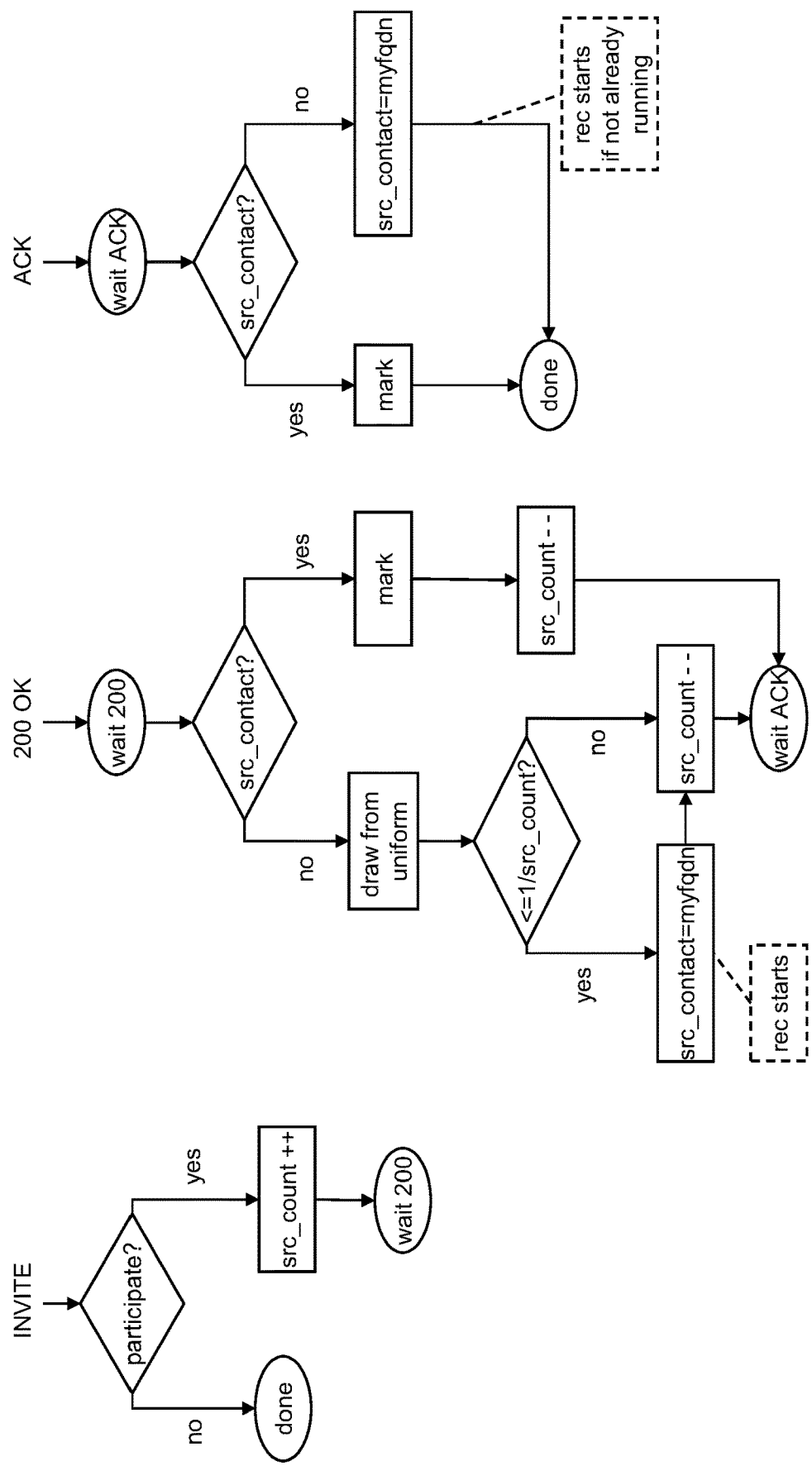
FIG. 3 shows a flowchart of a logic behind the exemplary embodiment of the method depicted in FIG. 2 according to another embodiment of the invention.

FIG. 3 shows a flowchart of the SRCs' logic regarding the recording of a session of the flow shown in FIG. 2. During call initiation (INVITE), an SRC can decide whether it should participate in or be considered for recording the session. Any SRC already under stress not wishing to participate or SRCs that do not understand signaling just pass it through. In such a case, the method according to the invention is terminated (done) for this SRC. In the event, the first SRC that participates in the scheme and can record the call attaches in the signaling an src-count parameter with value 1. All downstream SRCs that can record the call increment this src-count parameter subsequently (depicted with the "src_count++" in FIG. 3). Then the SRCs awaiting the SIP 200 OK message. During call answer (200 OK), the SRC who decides first to record the call will mark this in the signalling with an src-contact parameter. All upstream SRCs that see the src-contact parameter will know that the call is being recorded by a downstream element so they will not record the call and will wait for the ACK message. Additionally, all SRCs in the path will decrement the src_count parameter when sending downstream the SIP 200 OK signalling message (see "src_count-" in FIG. 3.). However, if an SRC wants to draw from uniform, it first checks, if its probability to record the call is less or equal to 1/src_count. If the probability of the SRC to record the call or session is less or equal to 1/src_count is true, this SRC is obliged to record the session since there is no other SRC upstream which could do the recording. Consequently, when the first (recording capable) SRC handles the 200 OK, and if no other SRC has decided to record the call, then this SRC will record the call since the probability for doing so will be 1. The SRC that has decided to record the call specifies its Fully Qualified Domain Name, FQDN (see src_contact=myfqdn in FIG. 3), and starts recording. However, the invention is not limited to FQDN. Other embodiments may utilize another feature as a substitute for FQDN for providing another type of identifier that identifies the specific SRC within the solution or network environment it operates in. For example, in NG9-1-1 it could also be the so-called Function Element Identifier. Also in this case, the SRC decreases the src_count parameter and then waits for the ACK message. During call acknowledgement (ACK), the SRC that is recording the call inserts in the SIP Signalling its specific src-contactparameter. This way all downstream elements will also be informed that an SRC will record the call. However, if a downstream SRC sees no contact-src parameter in ACK, it takes over to record the session.

Figure 4:
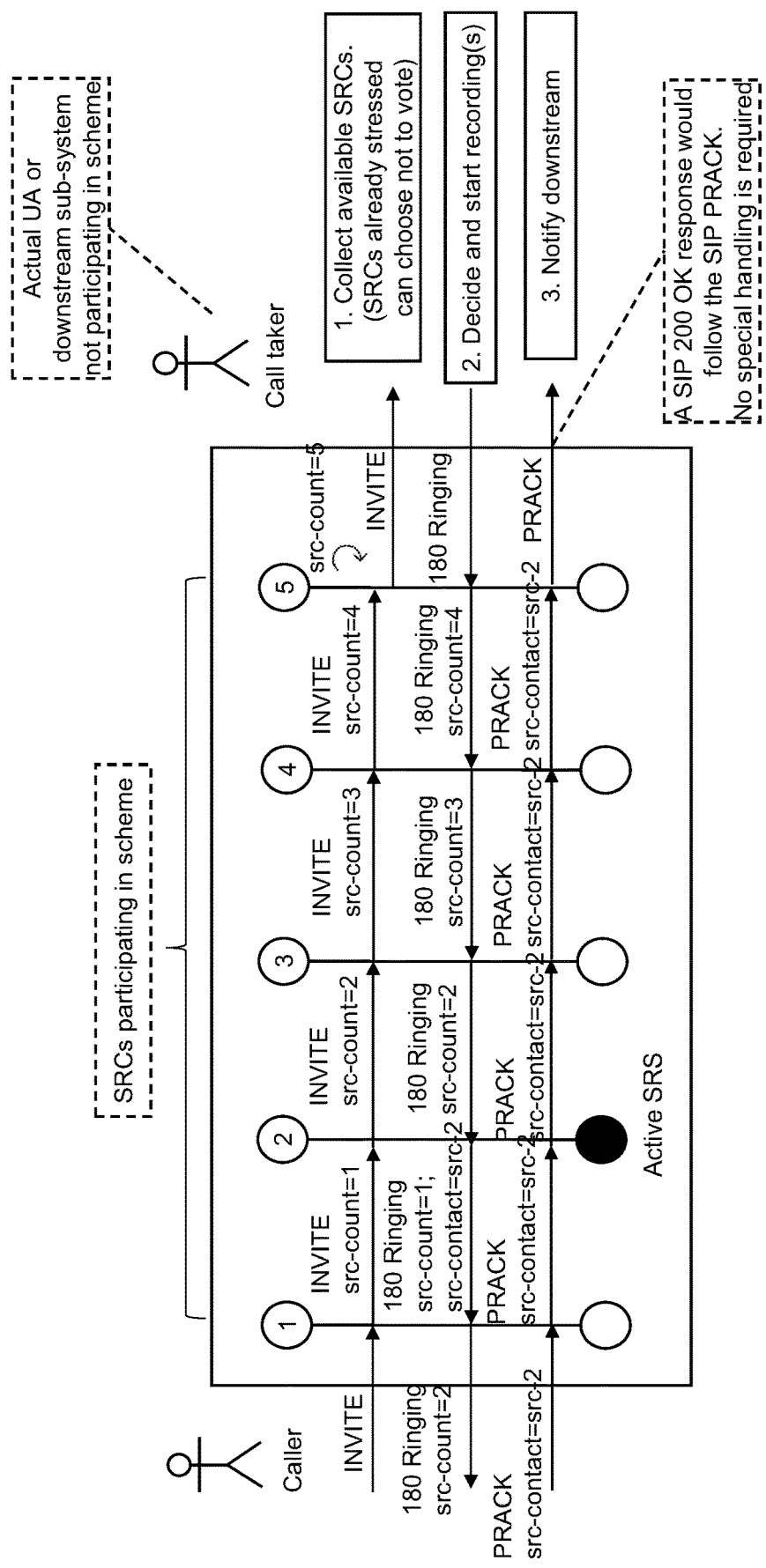
FIG. 4 shows a flowchart of an exemplary embodiment of the method for alternative early media signaling according to another embodiment of the invention.

FIG. 4 shows in another flowchart an example where parameters are exchanged before a dialog is established using the PRACK SIP method. The scheme can also be thought of comprising of three phases. In the first phase which occurs with the initial call setup signaling (INVITE message), the SRCs implicitly state their wish to participate in the voting scheme. In this phase, an already overwhelmed SRC can choose not to participate in the scheme. During call initiation (SIP INVITE), the first SRC (1) that participates in the scheme and is capable of recording the call attaches in the signaling an src-count parameter with the value 1. All downstream SRCs (2, 3, 4, 5) that are capable of recording the call increment this src-count parameter subsequently. In the second phase, the selection of the SRC is performed. Each SRC will decide probabilistically to record the call and, if it decides to record, then will indicate this through signaling. During SIP 180 Ringing, each SRC (1, 2, 3, 4, 5) beginning from the last one (5) will decide probabilistically (e.g. with probability of 1/src-count), if they will record the call. The SRC that decides to record the call will attach in the signaling an src-contact parameter with value src=<<SRC contact identifier>>. All upstream SRCs that see the src-contact parameter will know that the call will be recorded by a downstream element so they will not record the call. In FIG. 4, the SRC (2) sets the <<SRC contact identifier>>. Additionally, all SRC in the path will decrement the src-count parameter when sending downstream the 180 Ringing message. Consequently, when the first (recording capable) SRC handles the 180 Ringing message, and if no other SRC has decided to record the call, then this SRC will record the call since the probability for doing so will be 1. The third phase ensures that all the SRCs in the call path receive the pre-acknowledgement PRACK that a recording for the call has started. During call pre-acknowledgement (SIP PRACK), the SRC that will record the call (in this case SRC 2) will insert in the SIP Signaling the same src-contact parameter with the same value src=<<SRC contact identifier>>. This way, all downstream elements will also be informed that an SRC will record the call. The parameters used in INVITE, 180 Ringing and/or PRACK messages can be carried within an X header field or as parameters in existing header fields or the SDP, subject to implementation details. Assumptions for this specific case here are that recordings are started with the provisional response (180 Ringing, 183 Progress, etc.), SDP information is included in the message and that the PRACK method is supported. However, the method described herein is applicable to any valid signaling messages prior to the media stream initiation between the call parties. For environments where only proxies are used, the only requirement is that the information included in the signaling is carried throughout the domain of interest. For environments where B2BUAs are included, additional messages, e.g. SIP UPDATE/200 OK, can be used.

Further, it must be noted that it is assumed that all elements in the signaling path will proxy the messages and so the SIP PRACK messages will go end to end. Further, a SIP 200 OK response would follow the SIP PRACK, however, no special handling is required.

Figure 5A:
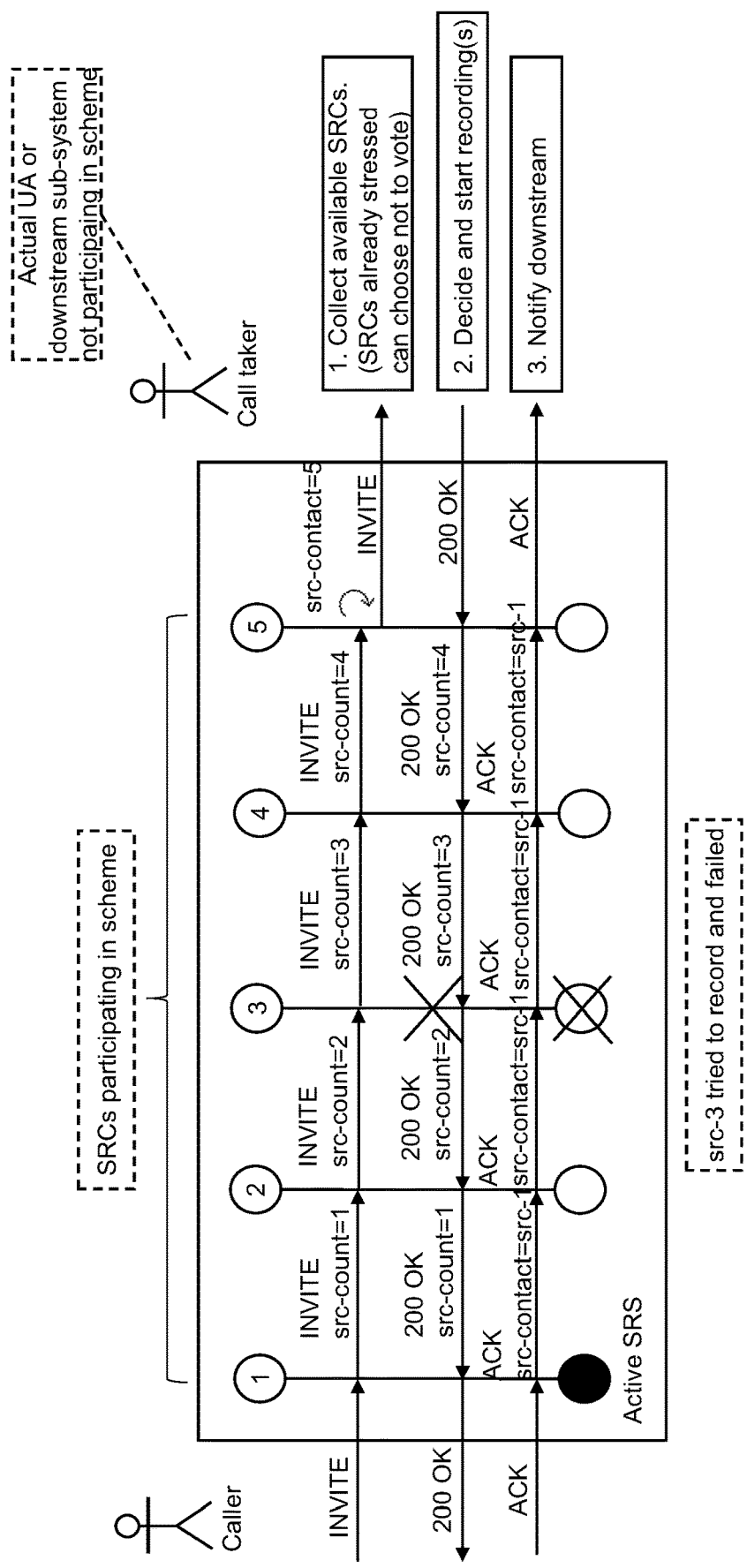
FIG. 5a shows a flowchart of an exemplary method for error handling characteristics according to another embodiment of the invention.
Figure 5B:
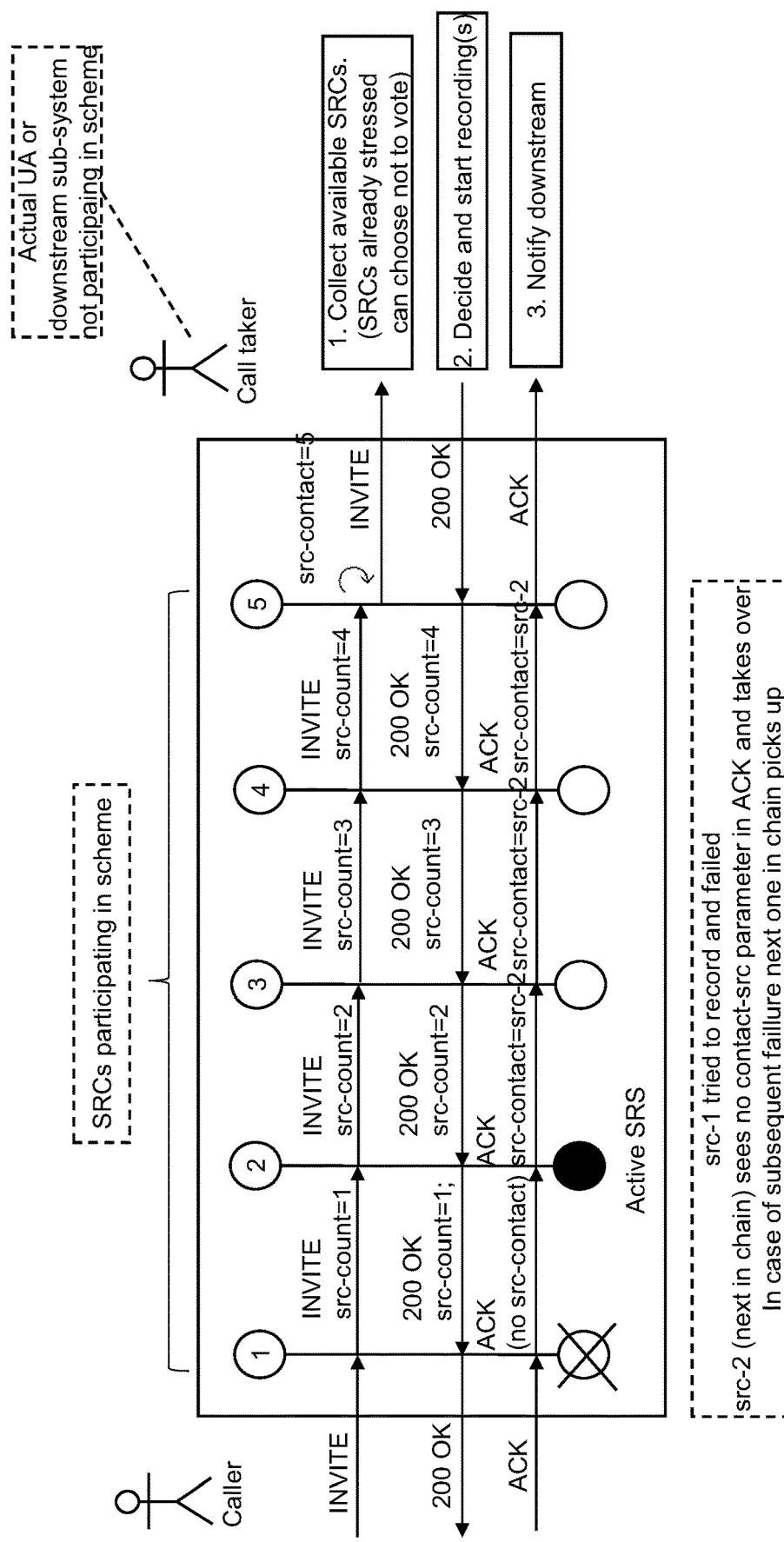
FIG. 5b shows a flowchart of another exemplary method for error handling characteristics according to another embodiment of the invention.

FIG. 5a and FIG. 5b show the error handling capabilities that can be utilized in upstream and downstream directions. FIG. 5a and FIG. 5b are based on the sequences shown in FIG. 2 and FIG. 3, which is why the description of these figures can be referred to. FIG. 5a shows an example scenario of error handling in the upstream direction, where failure handling is indistinguishable from the normal voting scheme in the upstream direction. In this example scenario, SRC 3 wants to take over the recording during the SIP 200 OK message but fails. Therefore, no src-contact parameter is passed to the upstream SRCs. Since SRC 1 cannot find an src-contact parameter in the ACK message, it will try to take over the recording. If SRC 1 can start the recording successfully, the downstream SRCs will be informed in the ACK message using the src-contact=src-1 parameter. If SRC 1 cannot start the recording for some reason, the second SRC in the row (downstream) will not receive an src-contact parameter with the ACK message (see FIG. 5b). This causes SRC 2 to try to take over the recording and, if this is successful, the other SRCs downstream are informed via the ACK message which should now have the src-contact=src-2 parameter. If this also fails, the third SRC 3 in the chain will try to take over the recording and so on. At the implementation level the mechanism uses two signalling parameters. The first signalling parameter is a counter incremented by SRCs participating in the scheme that are in the call path. This counter is also used for calculating the probability of an SRC recording a call. The second signalling parameter acts as an acknowledgement and is signalled when a recorder decides to record the call. This type of configuration can provide an advantage in that it can be guaranteed that a recording will happen as long as there is at least one functional SRC client in the call path and the communication link between it and the underlying SRS (Session Recording Server) is up. The scheme can be robust to errors and, at a minimum, does not do worse than existing schemes where, in the case of a recording initiation failure (for example, because of a temporary network connectivity issue), the call is not recorded at all. If the signalling path of a call fails, then there may potentially be more severe problems with the call itself, let aside the recording. The chance of a call failing can be reduced by utilization of one or more redundant nodes so that in the case of the primary node failure, the secondary (or backup node) takes over. Embodiments can be configured to sustain such an architecture.

Figure 6:
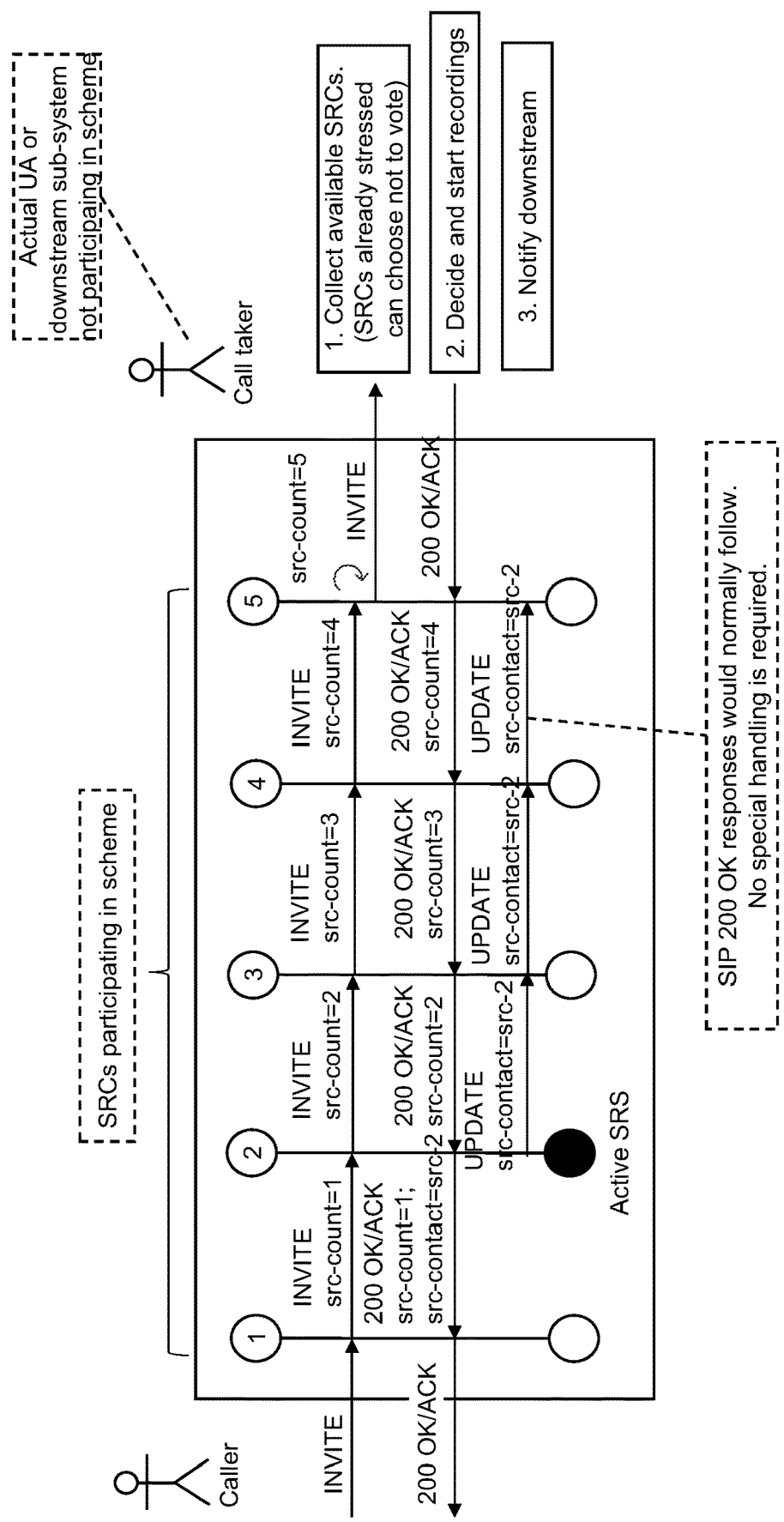
FIG. 6 shows a flowchart of an exemplary method dealing with back-to-back user agents according to another embodiment of the invention.

In the previous examples, it was assumed that all elements in the signalling path will proxy the messages and so the SIP ACK or PRACK messages will go end to end. FIG. 6 considers a different scenario where a back-to-back user agent (B2BUA) is used in the path and SIP ACK or PRACK messages do not go from end to end but are initiated by the B2BUA element. However, in this case an additional SIP message like a SIP UPDATE or a SIP INFO can be used to notify all downstream participants. A B2BUA is a logical entity that receives a request and processes it as a user agent server (UAS). In order to determine how the request should be answered, it acts as a user agent client (UAC) and generates requests. Unlike a proxy server, it maintains dialog state and must participate in all requests sent on the dialogs it has established. Since it is a concatenation of a UAC and UAS, no explicit definitions are needed for its behaviour.

It should be appreciated that different devices of the exemplary embodiments are machines that include a processor connected to a non-transitory memory. Examples of such machines include SBCs, SRCs, proxy servers, PSAPs, ESRPs, caller devices and call taker devices.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for coordinating session recordings, comprising:
    attaching, by each available Session Recording Client (SRCn) of a plurality of Session Recording Clients (SRCs) located along a signal path, a first SRC parameter n indicating that the SRCn is available for recording a communication session upon receiving a first downstream message, wherein the first SRC parameter n is incremented by each of the available SRCs downstream the signal path;
    attaching, by one of the available SRCs, a second SRC parameter indicating that the available SRC records the communication session upon receiving a first upstream message as an answer to the first downstream message, wherein in the first upstream message, the first SRC parameter n is decremented by each of the available SRCs upstream the signal path and wherein the second SRC parameter is propagated to each of the available SRCs upstream the signal path;
    notifying, by a second downstream message, each of the available SRCs about a recording of the communication session, wherein the second SRC parameter is propagated to each of the available SRCs downstream the signal path.

2. The method of claim 1, wherein the first downstream message is a Session Initiation Protocol (SIP) INVITE message, the first upstream message is a SIP 200 OK message, and the second downstream message is a SIP acknowledgement (SIP ACK) message.

3. The method of claim 1, wherein the first downstream message is a Session Initiation Protocol (SIP) INVITE message, the first upstream message is a 180 Ringing message, and the second downstream message is a SIP pre-acknowledgement (SIP PRACK) message.

4. The method of claim 1, wherein the first downstream message is a Session Initiation Protocol (SIP) INVITE message, the first upstream message is a SIP 200 OK/SIP acknowledgement (ACK) message and the second downstream message is a SIP UPDATE and/or SIP INFO message.

5. The method of claim 1, comprising:
    attaching, by an available downstream SRC, the second SRC parameter indicating that the available downstream SRC records the communication session upon receiving the second downstream message as an answer to the first upstream stream message without the second SRC parameter, wherein the second SRC parameter is propagated to each of the available SRCs downstream the signal path.

6. The method of claim 1, wherein the first SRC parameter n is a counter which is incremented by a value of 1 downstream or is decremented by a value of 1 upstream the signal path.

7. The method of claim 6, comprising:
    using, by the available SRCs, the first SRC parameter n for calculating a probability to record the communication session of the SRCn, wherein the probability is defined as 1/first SRC parameter n associated with SRCn.

8. The method of claim 1, comprising:
    using, by the available SRCs, the first SRC parameter n for calculating a probability to record the communication session of the SRCn, wherein the probability is defined as 1/first SRC parameter n associated with SRCn.

9. The method of claim 1, comprising:
    attaching, by one of the available SRCs, the second parameter indicating that the available SRC records the communication session after checking, by the available SRC, that its probability is less or equal to 1/first SRC parameter n associated with SRCn upon receiving a first upstream message as an answer to the first downstream message, the first parameter is decremented by each of the available SRCs upstream the signal path and wherein the second SRC parameter is propagated to each of the available SRCs upstream the signal path; and
    notifying, with the second downstream message each of the available SRCs about a recording of the communication session, wherein the second SRC parameter is propagated to each of the available SRCs downstream the signal path.

10. The method of claim 1, wherein not attaching, by an SRC, a first SRC parameter n upon receiving a first downstream message, if this SRC is unavailable for recording the communication session.

11. The method of claim 1, wherein each of the SRCs comprise one or more of a Session Border Controller (SBC) and/or a Border Control Function (BCF).

12. The method of claim 1, comprising:
    carrying the first SRC parameter n and/or second SRC parameter in upstream and/or downstream messages within an X header field and/or as parameters in existing header fields and/or in a Session Description Protocol (SDP).

13. A system for coordinating session recordings, the system comprising:

a plurality of Session Recording Clients (SRCs) communicatively connected within a signal path between a caller device and a call taker device;

each of the SRCs configured such that:

each available Session Recording Client (SRCn) of the SRCs located along the signal path, attach a first SRC parameter n indicating that the SRCn is available for recording a communication session upon receiving a first downstream message, wherein the first SRC parameter n is incremented by each of the available SRCs downstream the signal path;

one of the available SRCs attach a second SRC parameter indicating that the available SRC records the communication session in response to receiving a first upstream message as an answer to the first downstream message, wherein in the first upstream message, the first SRC parameter n is decremented by each of the available SRCs upstream the signal path and wherein the second SRC parameter is propagated to each of the available SRCs upstream the signal path; and a second downstream message is sendable to notify each of the available SRCs about a recording of the communication session, wherein the second SRC parameter is propagated to each of the available SRCs downstream the signal path.

14. The system according to claim 13, wherein the system comprises: the caller device and/or the call taker device.

15. A non-transitory computer-readable medium having program code stored thereon so that when the code is executed by a processor, a device having the processor carries out a method defined by the code, the method comprising:

attaching, by an available Session Recording Client (SRCn) a first SRC parameter n indicating that the SRCn is available for recording a communication session in response to receiving a first downstream message, wherein the first SRC parameter n is incrementable by each available SRCs downstream a signal path;

attaching, by the SRCn a second SRC parameter indicating that the SRCn records the communication session in response to receiving a first upstream message as an answer to the first downstream message, wherein in the first upstream message, the first SRC parameter n is decremented by each available SRC upstream the signal path and wherein the second SRC parameter is propagated to each available SRC upstream the signal path;

notifying, by a second downstream message, each of the available SRCs about a recording of the communication session, wherein the second SRC parameter is propagated to each available SRCs downstream the signal path.

* * * * *